Sept. 15, 1953

H. L. FITCH 2,652,208

FILM-WINDING DEVICE

Filed Feb. 7, 1950

HAROLD L. FITCH
INVENTOR

BY Daniel J. Mayne
J. Griffin Little
ATTORNEYS

Sept. 15, 1953   H. L. FITCH   2,652,208
FILM-WINDING DEVICE
Filed Feb. 7, 1950   2 Sheets-Sheet 2
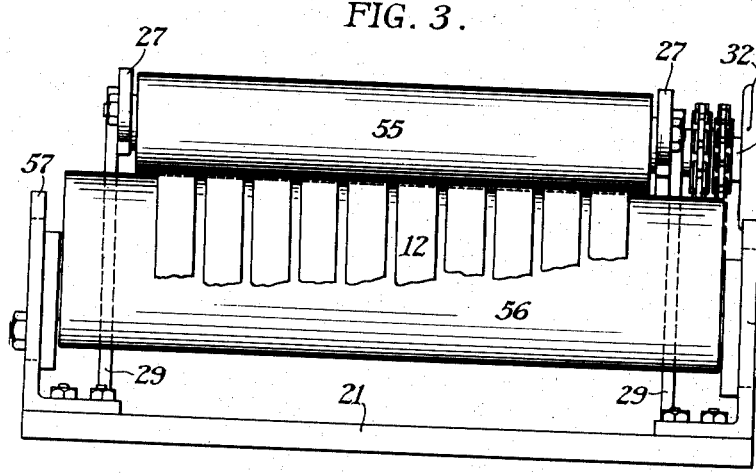
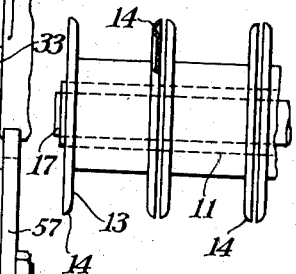
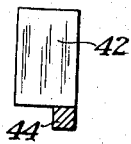
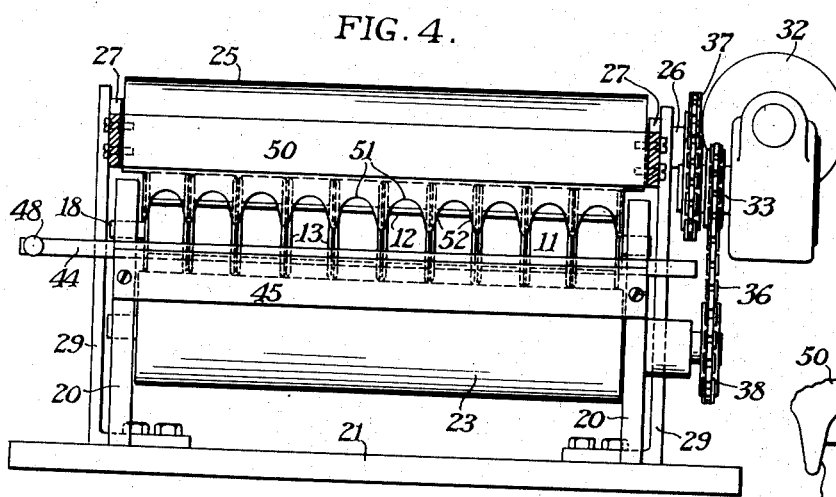
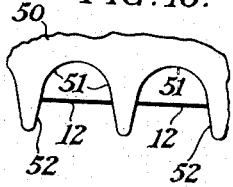
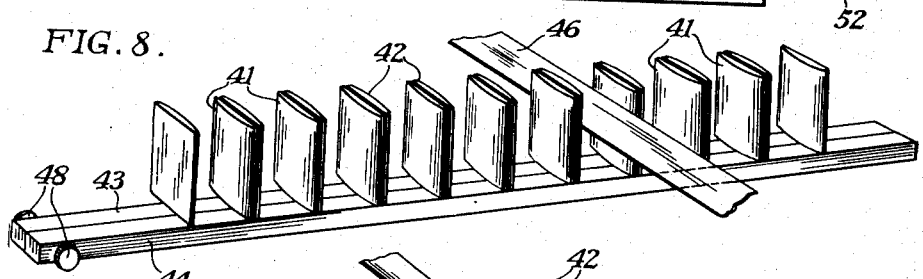
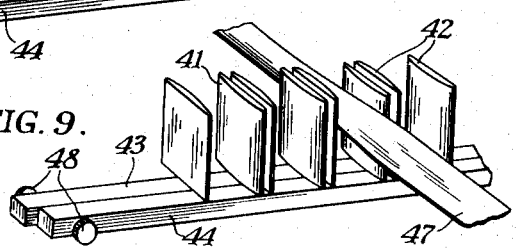
HAROLD L. FITCH
INVENTOR
BY Daniel J. Mayne
J. Griffin Little
ATTORNEYS Patented Sept. 15, 1953

2,652,208

UNITED STATES PATENT OFFICE 2,652,208

FILM-WINDING DEVICE

Harold L. Fitch, Rochester, N. Y., assignor to Eastman Kodak Company, Rochester, N. Y., a corporation of New Jersey Application February 7, 1950, Serial No. 142,873

11 Claims. (Cl. 242—66)

The present invention relates to a winding device, and more particularly to a device for winding a film strip onto a film spool.

Certain types of roll films now on the market have one end of the film strip attached or anchored to the core of the film spool. When the film is to be processed, the film strip is merely unwound from the spool, and the unwound film, with its attached spool, is passed through the various processing or treating baths. The films may be passed separately through the treating solutions, or a plurality of film strips, and their attached spools, may be mounted on a suitable hanger for movement as a unit through the treating solutions. Such a hanger for a plurality of film strips and associated spools is shown and described in applicant's co-pending application Ser. No. 135,626, filed December 29, 1949, now Patent No. 2,611,300, issued September 23, 1952.

After the film strips have been completely processed and dried, each film strip is wound back onto its respective spool. To accomplish this result, the film hanger of the above-mentioned application is removed from the processing machine, and the spool-carrying shaft is positioned in cooperating relation with a drive means which engages simultaneously all the film spools to rotate the latter to wind simultaneously the various film strips onto their respective spools. All film spools are of the type which are provided with end flanges, the peripheries of which are formed with inwardly extending ribs or beads which are spaced apart a distance which is slightly less than the "normal" width of the film so that the latter must be flexed or bent transversely an amount sufficient to permit the film to pass between the beads. Thereafter the film flattens to its "normal" width. By the term "normal width," as used in the specification and claims, is meant the width of the film in its flat or unflexed relation. In order to insure proper operation, means is provided to maintain the different film strips in proper alignment with their respective flexing means and spools. After the film strips have been wound onto their spools, the latter may be removed from the supporting shaft.

The present invention has, therefore, as its principal object, a winding device by which a plurality of film strips may be wound simultaneously back onto a plurality of film spools, each strip having one end thereof attached or anchored to one of the film spools.

Still another object of the invention is the provision of a winding device in which the various films are separately and individually flexed so that they may pass between the narrowed flanges of their respective spools.

Yet another object of the invention is the provision of means for maintaining the various film strips in individual alignment with their respective flexing means and spools.

And yet another object of the invention is the provision of a winding device for a plurality of film strips which is simple in construction, comprises few parts of rugged construction, easy to operate and highly effective in use.

To these and other ends the invention resides in certain improvements and combinations of parts, all as will be hereinafter more fully described, the novel features being pointed out in the claims at the end of the specification.

In the drawings:

Fig. 3 is an end view taken from the right of Fig. 1 showing the relation of the parts;

Fig. 4 is a transverse view, with parts in section, taken substantially on line 4—4 of Fig. 1 showing the relation of the aligning and flexing means to the different film spools;

Fig. 5 shows a portion of the spool shaft with a pair of film spools thereon;

Fig. 6 shows one of a pair of flexing members which imparts a lateral bend to the film strip as it passes through the flexing means, and illustrates the manner of mounting one of the flexing members;

Fig. 7 is a view similar to Fig. 6, showing the other of the pair of flexing members, and the mounting means therefor;

Fig. 8 is a perspective view of the group of pairs of flexing members arranged in their extended position to allow the film strips to be positioned therebetween in a flat relation prior to the winding operation;

Fig. 9 is a view similar to Fig. 8 but showing a portion of the flexing members in their operative position to engage and flex the various film strips independently; and Fig. 10 is a partial front view of the aligning means by which the various film strips are separately and independently aligned and guided to their respective flexing members and then to the proper film spool.

Figures 1, 2:
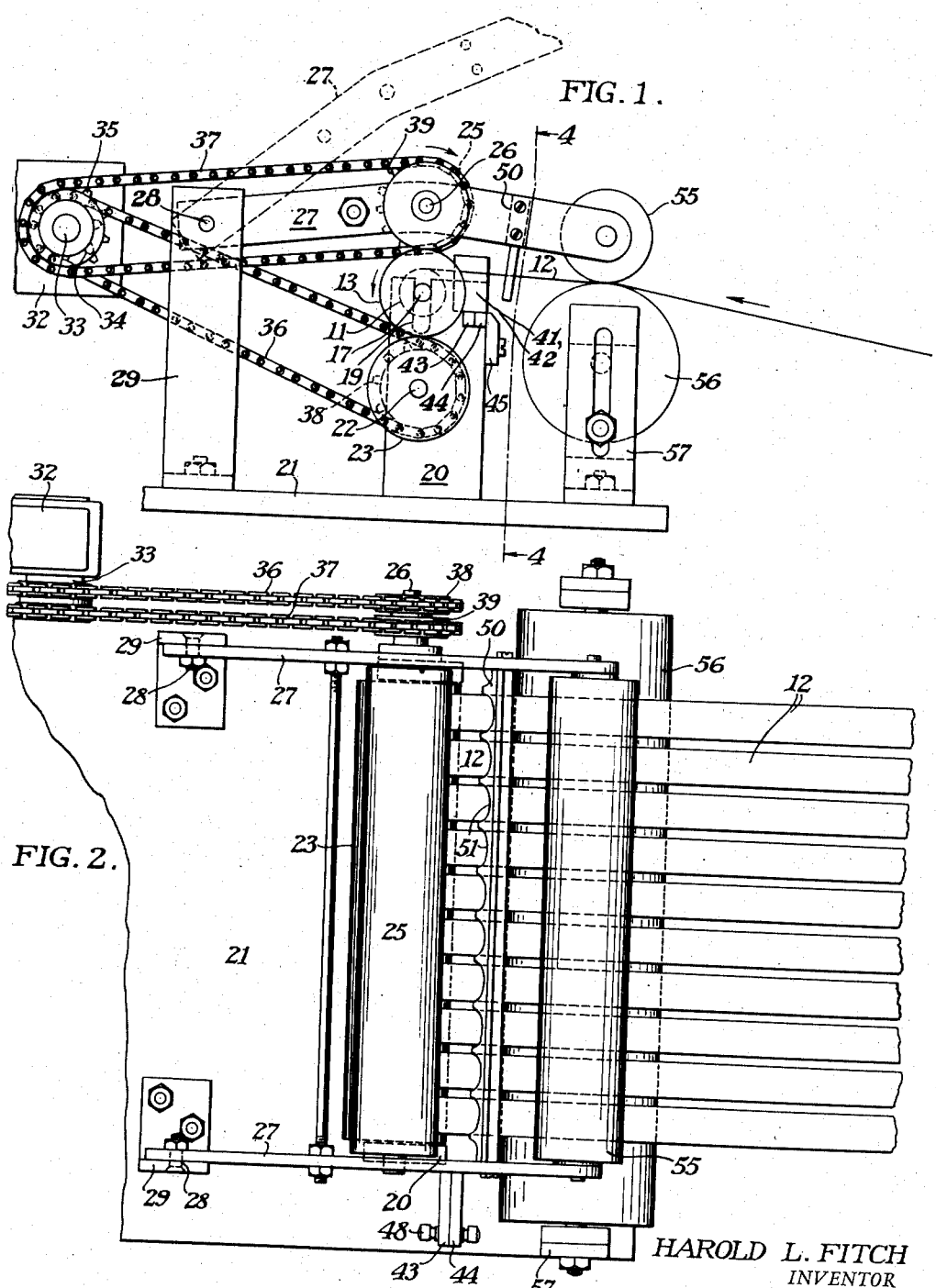
Fig. 1 is a side elevation view of the winding device of the present invention with the parts in their winding or operative relation.
Fig. 2 is a plan view of the mechanism illustrated in Fig. 1.

The drawings show a plurality of roll-film spools each of which is provided with a cylindrical core 11 to which one end of a film strip 12 is attached or anchored in any suitable or well known manner. Each spool is provided with a pair of end flanges 13 secured to the opposite ends of the core. The peripheries or rims of the flanges 13 are provided with inwardly extending ribs or beads 14 which are spaced apart a distance less than the "normal" or unflexed film 12, for reasons well known in the art. As such spools are well known and do not, per se, form a part of the present invention, further details are not deemed necessary. Such a spool structure is shown in the patent to Mihalyi, 2,336,278, issued December 7, 1943, to which reference may be had for a detailed disclosure.

As mentioned above, the spools are mounted in a group on a suitable hanger for unitary passage through the processing solution. Each hanger, as shown in applicant's above-mentioned application, is provided with a shaft 17 on which a plurality of film spools, of the above type, are loosely positioned. As the shaft and spool arrangement forms no part of the present invention, details thereof are not described or illustrated. Suffice it to say that the shaft 17 loosely supports a plurality of film spools in aligned relation, each spool having attached thereto one end of a film strip. In the present embodiment, see Figs. 2, 4, ten such spools are mounted on the shaft 17, but it is obvious that a larger or smaller group may be employed without departing from the present invention. Therefore, the showing of ten spools is not intended as a limitation.

Opposite ends 18 of shaft 17 are positionable in opening end slots 19 formed in laterally spaced brackets 20 which extend upwardly from a base or support 21, as best shown in Figs. 1, 3, and 4. The brackets 20 also have rotatably mounted thereon, the ends of a shaft 22 which carries a drive and supporting roller 23. The latter is so positioned that when shaft 17 is positioned in slots 19, the flanges 13 of the film spools will rest on and be supported entirely by roller 23, the shaft 17 being positioned slightly above the bottom of slot 19, as shown in Fig. 1. Thus, the film spools may be easily, quickly and accurately positioned merely by placing the ends 18 of shaft 17 in slots 19 and lowering the shaft until the spool flanges 13 contact roller 23. The latter, in addition to driving the spools, as will be later described, provides a support on which the various spools rest.

In order to wind the film strips onto the spools, the latter are rotated in the direction of the arrow of Fig. 1. To secure this result, an upper roller 25 is arranged in vertical alignment with the lower roller 23, and rests on the spool flanges to retain the latter against the lower or supporting roller 23, all as shown in Fig. 1. To facilitate the placing of the spool-carrying shaft 17 in position, the upper roller 25 is mounted on a shaft 26, journaled in spaced arms 27, pivoted at 28 to spaced standards 29 which extend upwardly from base 21. Thus, the upper roller 25 may be swung about pivot 28 to an inoperative position, as shown in dotted lines Fig. 1, to permit shaft 17, with its film spools, to be mounted in position. Whereupon the arms 27 are lowered to bring the roller 25 into flange-engaging relation. The arms 27, therefore, may be considered broadly as a pivoted frame on which roller 25, and other parts to be later described, is mounted for movement to and from operative position.

While either of the rollers 23 or 25 which engage the spools, may be driven, in the preferred embodiment both rollers are driven. To secure this result, an electric motor 32 is provided with a shaft 33 on which are mounted sprockets 34 and 35 connected by chains 36 and 37 to sprockets 38 and 39 carried by shafts 22 and 26 respectively. Thus, both rollers 23 and 25 are driven positively and in the proper direction to rotate all the film spools as a unit to wind up all the film strips simultaneously. Thus, the lower roller 23 not only serves to support the spools, but cooperates with the upper roller 25 to impart a positive driving force to the spools so that the various film strips may be wound on the respective spools.

As mentioned above, the spool flanges are provided with marginal ribs or beads 14 which are spaced apart a distance less than the flat or "normal" width of the film. Accordingly, in order to enable the respective film strips to be wound onto the spools, it is necessary to flex or bend each strip slightly and independently in a transverse direction to decrease the width of each strip to a dimension slightly less than the distance between the ribs to permit the strip to pass therebetween, all of which is deemed apparent.

To secure this result, a novel and simple flexing means is provided in advance of and in substantial alignment with each spool to impart a slight transverse bend to each strip as it approaches its respective spool. This flexing means comprises in the present embodiment, pairs of right and left hand, upwardly extending, adjustable plates or fingers 41 and 42 arranged in lateral alignment, one pair being associated with each film strip, see Figs. 8 and 9. While these flexing members or plates may be separately and independently adjusted, it is preferred to connect the corresponding plates of each pair so they may be moved as a unit. To this end, the right plates 41 are all connected to a laterally extending bar 43, while the left plates 42 are similarly connected to a rod or bar 44, both bars being mounted for slidable movement on a bracket 45 carried by bracket 20, Fig. 1. When the spools are initially placed in position, the rods 43 and 44 are in the position shown in Fig. 8, and plates 41 and 42 are moved to their maximum spacing to receive the strips 13 therebetween in a flat or non-flexed relation, as shown at 46, Fig. 8. However, when the upper roll 25 is lowered and the spool driven to wind the film, the rods 43 and 44 are then shifted laterally by means of knobs 48 or other suitable means to decrease the space between plates 41 and 42 as shown in Fig. 9. This decrease in plate spacing will serve to engage the marginal edges of the various film strips to impart and slightly flex or bend each strip, as shown, for example, at 47, Fig. 9. The relative movement of the plates 41 and 42 is such as to secure the desired or necessary degree of flexing of the various strips, as is deemed apparent. If desired, the rods 43 anad 44 may be provided with suitable cooperating scale members, not shown, to indicate the positions to which the respective bars should be moved. Also, suitable connecting means, such as racks and pinions, may be used between the bars so that movement by one bar will move the other bar simultaneously and automatically in proper direction and the proper amount. As many such connecting means will readily suggest themselves to any mechanic, details thereof are not deemed necessary. All that is required is that the plates 41 and 42 of each pair be mounted for movement toward and from each other to vary the spacing therebetween, so as to secure the desired flexing operation.

Referring to Figs. 8 and 9, it is apparent that the plates 41 and 42 are open at their tops. Therefore, in order to impart the necessary bending or flexing of the strips, it is essential that the horizontal positions of the strips be such that the strips actually pass between the flexing plates. Therefore, the present invention provides means for aligning the various strips as they approach the flexing plates, see Fig. 1, to insure that each strip actually passes between the proper flexing plates before reaching its film spool, the advantages of which are deemed apparent.

In the preferred embodiment, this aligning means comprises a plate 50, the ends of which are connected to arms 27 ahead of the flexed plates 41 and 42, as best shown in Fig. 1. This plate 50 is formed with a plurality of inverted U-shaped openings 51, the edges 52 of which are arranged in substantial alignment with the flexing plates 41 and 42 and are positioned to engage the marginal edges of the various film strips to guide and align the latter accurately with the flexed plates so as to direct the film strips therebetween. Thus, each strip is separately, independently and accurately guided and directed between its proper flexing plates. Also, the openings 52 limit any possible upward drift or movement of any strip so as to insure that each strip will always be directed between the flexing plates. The film strips 12 are directed toward openings 51 of the aligning means by use of a pair of upper and lower idler guide rolls 55 and 56, respectively, the former being journaled in the arms 27, while the latter is journaled in spaced standard 57 carried by base 21. The rollers 55 and 56 are so spaced that the bight between the rollers is in substantially horizontal alignment with the aligning means and the flexing means as clearly shown in Fig. 1, so as to direct the films in proper relation thereto. Thus, as the strips 12 are being wound up, they first pass between the guide rollers 55 and 56, which direct the strips to the openings 51 of the aligning plate 50 which properly aligns each strip with its flexing members 41 and 42 and its film spool. The aligned strip then passes between the flexing plates which impart a transverse bend to the films to permit the latter to pass between the respective spool flanges 14, so that the films may be wound up on the spool cores.

The present invention thus provides a winding mechanism in which a plurality of film strips are wound simultaneously onto a plurality of film spools. Each strip is directed toward its proper spool, and as it approaches the latter the strip is directed and flexed transversely to permit passage between the spool flanges.

While one embodiment of the invention has been disclosed, it is understood that the inventive idea may be carried out in a number of ways. Therefore, the present application is intended to cover all variations and modifications thereof which may fall within the scope of the appended claims.

What I claim and desire to secure by Letters Patent of the United States is:

1. A film-winding device for winding a film strip onto a double-flanged film spool to which one end of said strip is attached, the balance of said strip being unwound and extending away from said spool, comprising, in combination, a shaft on which said spool is loosely positioned, means for supporting said spool, means cooperating with said supporting means for rotating said spool to wind said strip thereon, means to position said shaft and spool so that the latter will engage said supporting and rotating means, laterally adjustable means for imparting a transverse bend to said strip to enable the latter to pass between said flanges the peripheries of which are spaced apart a distance less than the width of said strip, means for aligning said strip with said bending means, and means to guide said strip to said aligning means.

2. A film-winding device for winding a film strip onto a double-flanged film spool to which one end of said strip is being attached, the balance of said strip being unwound and extending away from said spool, comprising, in combination, a shaft on which said spool is loosely positioned, means for supporting said spool, means cooperating with said supporting means for rotating said spool to wind said strip thereon, means to position said shaft and spool so that the latter will engage said supporting and rotating means, laterally adjustable means for imparting a transverse bend to said strip to enable the latter to pass between said flanges the peripheries of which are spaced apart a distance less than the width of said strip, means for aligning said strip with said bending means, means to guide said strip to said aligning means, and means for laterally adjusting said bending means.

3. A film-winding device for winding a film strip onto a double-flanged film spool to which one end of said strip is attached, the balance of said strip being unwound and extending away from said spool, comprising, in combination, a support, a pair of laterally spaced brackets carried by said support, a shaft on which said spool is positioned loosely, a spool-supporting roller carried by said brackets, means on said brackets for positioning said shaft so that said spool will rest on and be supported by said roller, laterally adjustable flexing means positioned ahead of said spool and adapted to engage the marginal edges of said strip to flex the latter transversely to reduce the width thereof so that it may pass freely between the spool flanges the peripheries of which are spaced apart a distance less than the normal width of said strip, a pivoted frame member, a drive roller carried by said frame member and engaging said spool and cooperating with said first roller to clamp the spool therebetween and to rotate said spool, and means carried by said frame for guiding said strip to said flexing means.

4. A film-winding device for winding a film strip onto a double-flanged film spool to which one end of said strip is attached, the balance of said strip being unwound and extending away from said spool, comprising, in combination, a support, a pair of laterally spaced brackets carried by said support, a shaft on which said spool is positioned loosely, a spool-supporting roller carried by said brackets, means on said brackets for positioning said shaft so that said spool will rest on and be supported by said roller, laterally adjustable flexing means positioned ahead of said spool and adapted to engage the marginal edges of said strip to flex the latter transversely to reduce the width thereof so that it may pass freely between the spool flanges the peripheries of which are spaced apart a distance less than the normal width of said strip, a pivoted frame member, a roller carried by said frame member and engaging said spool and cooperating with said first roller to clamp said spool therebetween, means for rotating at least one of said rollers to wind said strip onto said spool, means carried by said frame member and positioned ahead of said flexing means to align said strip therewith, a guide roller carried by said support and positioned ahead of said aligning means and over which said strip passes on its way to said aligning means, and an idle roller carried by said frame member and cooperating with said other guide roller to direct said strip to said aligning means.

5. A winding device for winding simultaneously a plurality of separate film strips on separate double flanged film spools, each strip having one end thereof attached to its spool, the balance of each strip being unwound and extending away from its spool, means for supporting all of said spools in axial alignment, means for rotating said spools as a unit to wind the strips thereon, separate laterally adjustable flexing means positioned adjacent and in lateral alignment with said spools to engage each strip independently to impart a transverse bend therein to permit said strips to pass freely between said flanges the peripheries of which are spaced a distance less than the width of the strip, and means for varying the spacing of each flexing means.

6. A winding device for winding simultaneously a plurality of separate film strips on separate double flanged film spools, each strip having one end thereof attached to its spool, the balance of each strip being unwound and extending away from its spool, means for supporting all of said spools in axial alignment, means for rotating said spools as a unit to wind the strips thereon, separate laterally adjustable flexing means positioned adjacent and in lateral alignment with said spools to engage each strip independently to impart a transverse bend therein to permit said strips to pass freely between said flanges the peripheries of which are spaced a distance less than the width of the strip, means for moving the flexing means to open position to permit said strip to be placed therebetween in unflexed relation, and means to adjust the spacing of said flexing means to move the latter into flexing relation with said strips to bend the latter laterally.

7. A winding device for winding simultaneously a plurality of separate film strips on separate double flanged film spools, each strip having one end thereof attached to its spool, the balance of each strip being unwound and extending away from its spool, means for supporting all of said spools in axial alignment, means for rotating said spools as a unit to wind the strips thereon, separate laterally adjustable flexing means positioned adjacent and in lateral alignment with said spools to engage each strip independently to impart a transverse bend therein to permit said strips to pass freely between said flanges the peripheries of which are spaced a distance less than the width of the strip, means for varying the spacing of said flexing means, and aligning means in lateral alignment with each flexing means to align each strip separately and independently to its flexing means.

8. A winding device for winding simultaneously a plurality of separate film strips on separate double flange film spools, each strip having one end thereof attached to its spool, the balance of each strip being unwound and extending away from its spool, means for supporting all of said spools in axial alignment, means for rotating said spools as a unit to wind the strips thereon, separate laterally adjustable flexing means positioned adjacent and in lateral alignment with said spools to engage each strip independently to impart a transverse bend therein to permit said strips to pass freely between said flanges the peripheries of which are spaced a distance less than the width of the strip, means for moving the flexing means to open position to permit said strip to be placed therebetween in unflexed relation, means to adjust the spacing of said flexing means to move the latter into flexing relation with said strips to bend the latter laterally, and separate aligning means positioned in lateral alignment with each flexing means to align each strip separately and independently to its flexing means.

9. A winding device for winding simultaneously a plurality of separate film strips on separate double flanged film spools, each strip having one end thereof attached to its spool, the balance of each strip being unwound and extending away from its spool, means for supporting all of said spools in axial alignment, means for rotating said spools as a unit to wind the strips thereon, separate laterally adjustable flexing means positioned adjacent and in lateral alignment with said spools to engage each strip independently to impart a transverse bend therein to permit said strips to pass freely between said flanges the peripheries of which are spaced a distance less than the width of the strip, means for varying the spacing of each flexing means, and aligning means associated with said drive means and movable into lateral alignment with each of said flexing means to engage each strip separately to align the strip independently and individually to its flexing means.

10. A winding device for winding simultaneously a plurality of separate film strips on separate double flanged film spools, each strip having one end thereof attached to its spool, the balance of each strip being unwound and extending away from its spool, a shaft on which a group of said spools is arranged in axial alignment, a roller on which the flanges of said spools rest to support said spools, a pivoted frame, a roller carried by said frame and movable into vertical alignment with said first roller and into engagement with said flanges to cooperate with said first roller to clamp said flanges therebetween, means for driving at least one of said rollers to rotate said spools as a unit, laterally adjustable flexing means positioned adjacent and in lateral alignment with each spool to engage said strips separately to impart a transverse bend to each strip so as to permit the strips to pass freely between the flanges of said spools the peripheries of which are spaced a distance less than that of said strips before bending, and aligning means carried by said frame and movable into position ahead of and in lateral alignment with said flexing means to engage each strip to align each strip separately and independently with its flexing means.

11. A winding device for winding simultaneously a plurality of separate film strips on separate double flanged film spools, each strip having one end thereof attached to its spool, the balance of each strip being unwound and extending away from its spool, a shaft on which a group of said spools is arranged in axial alignment, a roller on which the flanges of said spools rest to support said spools, a pivoted frame, a roller carried by said frame and movable into vertical alignment with said first roller and into engagement with said flanges to cooperate with said first roller to clamp said flanges therebetween, means for driving at least one of said rollers to rotate said spools as a unit, laterally adjustable flexing means positioned adjacent and in lateral adignment with each spool to engage said strips separately to impart a transverse bend to each strip so as to permit the strips to pass freely between the flanges of said spools the peripheries of which are spaced a distance less than that of said strips before bending, aligning means carried by said frame and movable into position ahead of and in lateral alignment with said flexing means to engage each strip to align each strip separately and independently with its flexing means, means to change the lateral adjustment of said flexing means to permit said strips to be positioned thereon in unbent relation, and means to move said flexing means toward and into engagement with the marginal edges of each strip to flex each strip laterally.

HAROLD L. FITCH.

References Cited in the file of this patent

UNITED STATES PATENTS

| Number | Name | Date |
| --- | --- | --- |
| 847,418 | Lichtenstadt | Mar. 19, 1907 |
| 1,188,217 | Stehle | June 20, 1916 |
| 1,680,979 | Gardner | Aug. 14, 1928 |
| 2,297,525 | Anheuser | Sept. 29, 1942 |